United States Patent
Fyke

(10) Patent No.: US 9,020,567 B2
(45) Date of Patent: Apr. 28, 2015

(54) AUTHENTICATION USING FINGERPRINT SENSOR IN GESTURE PATH

(71) Applicant: Research In Motion Limited, Waterloo (CA)

(72) Inventor: Steven Henry Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 118 days.

(21) Appl. No.: 13/857,175

(22) Filed: Apr. 5, 2013

(65) Prior Publication Data

US 2014/0302818 A1    Oct. 9, 2014

(51) Int. Cl.
*H04W 72/04* (2009.01)
*H04W 88/02* (2009.01)
*H04W 64/00* (2009.01)
*H04W 12/08* (2009.01)
*H04W 12/12* (2009.01)
*H04W 12/06* (2009.01)
*H04W 4/02* (2009.01)
*H04W 8/22* (2009.01)
*G06F 21/32* (2013.01)
*G06F 3/0488* (2013.01)
(Continued)

(52) U.S. Cl.
CPC .............. *G06F 21/32* (2013.01); *G06F 3/0488* (2013.01); *G06F 21/36* (2013.01); *H04L 63/0861* (2013.01); *H04W 12/06* (2013.01); *H04W 88/02* (2013.01)

(58) Field of Classification Search
CPC ... H04L 63/0861; H04L 63/08; H04L 63/083; G06F 21/32; G06T 7/0012; H04W 12/06; H04W 12/08; H04W 4/02; H04W 88/02; H04W 8/22; H04W 40/02; H04W 4/005; H04W 4/046; H04W 64/003; H04W 72/0453; H04W 88/06; H04W 8/02; H04M 1/725; H04N 5/23293
USPC ........... 455/418, 456.1, 457, 566, 411, 556.1, 455/14.02; 345/173, 441, 158, 156; 340/5.52, 5.54, 5.85, 426.15, 5.53; 348/333.02; 370/352
See application file for complete search history.

(56) References Cited

U.S. PATENT DOCUMENTS 8,311,514 B2    11/2012    Bandyopadhyay et al.
8,451,114 B2 *  5/2013    Gold ........................ 340/539.2
(Continued)

FOREIGN PATENT DOCUMENTS

EP    1 605 671    12/2005

OTHER PUBLICATIONS partial EP Search Report dated Jun. 13, 2013.
(Continued)

*Primary Examiner* — Inder Mehra
(74) *Attorney, Agent, or Firm* — Rowand LLP

(57) ABSTRACT

Methods and devices for obtaining a fingerprint sample due to incidental contact with a fingerprint sensor when performing a gesture are described. In one aspect, an electronic device includes a touchscreen display and a fingerprint sensor adjacent the touchscreen display. One or more processors are associated with instructions that cause a fingerprint sample to be obtained and that cause a gesture to be detected. The gesture is characterized by input representing movement that is directed at or from the fingerprint sensor. The input is received, at least in part, at an end of the touchscreen display that is nearest the fingerprint sensor.

20 Claims, 7 Drawing Sheets

(51) Int. Cl.
  *G06F 21/36* (2013.01)
  *H04L 29/06* (2006.01)

(56) References Cited

U.S. PATENT DOCUMENTS

| | | | |
|---|---|---|---|
| 2002/0018051 A1* | 2/2002 | Singh | 345/173 |
| 2004/0131237 A1 | 7/2004 | Machida | |
| 2006/0008127 A1* | 1/2006 | Sellers | 382/124 |
| 2009/0083847 A1 | 3/2009 | Fadell | |
| 2012/0127179 A1* | 5/2012 | Aspelin | 345/441 |
| 2012/0182253 A1 | 7/2012 | Brosnan | |
| 2012/0258773 A1 | 10/2012 | Alvarez et al. | |
| 2013/0108124 A1* | 5/2013 | Wickboldt et al. | 382/124 |
| 2014/0267085 A1* | 9/2014 | Li et al. | 345/173 |

OTHER PUBLICATIONS

EPO, Extended European Search Report relating to application No. 13162465.2 dated Sep. 30, 2013.
"Apple Bids for Authentec: Imagine An IPhone With a Fingerprint Sensor", dated Jul. 27, 2012.
"Apple files patent application for fingerprint sensor that can be transparent or opaque", Nicole Lee posted Oct. 12, 2012.
"Apple patents fingerprint sensor for biometric iPhone unlock", Matt Swider, dated Oct. 12, 2012.
"Apple Wants to Use Your Fingerprints to Unlock Your iPhone", by Mario Aguilar, dated Oct. 11, 2012.
"Using Your Fingerprint to Unlock Your Atrix", retrieved Feb. 27, 2013.
U.S. Appl. No. 13/399,598, filed Feb. 17, 2012.
U.S. Appl. No. 13/303,344, filed Nov. 23, 2011.

* cited by examiner

AUTHENTICATION USING FINGERPRINT SENSOR IN GESTURE PATH

TECHNICAL FIELD

The present disclosure relates to authentication and, more particularly, to fingerprint based authentication devices.

BACKGROUND

Electronic devices, such as mobile communication devices, are often used to receive and store sensitive data. For example, such devices are often used in an enterprise environment where confidential information may be passed around between such devices. Device security is, therefore, often a concern for enterprise users.

Device security may also be an issue for non-enterprise users. For example, users who are using devices for personal use may wish to secure such devices so that unauthorized users, such as children for example, are unable to perform certain actions such as making telephone calls, making long distance telephone calls, accessing the Internet, and/or making purchases from the device.

Password-based protection has historically been used to prevent electronic devices from being used by an unauthorized user. Passwords are typically alpha-numeric strings or sequences that are input via a keyboard. Such protection is vulnerable to a number of attacks. For example, a password-guessing attack might be employed in order to gain unauthorized use of an electronic device. Unauthorized access may also be obtained in password protected environments when an unauthorized user observes entry of a password by an authorized user and makes note of the password.

In addition to the security concerns, password entry may also be time-consuming for a user since they are required to sequentially input a string whose security value increases with its length. As password length increases, the security of the password is improved, but the time required for input is also increased.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

Figure 1:
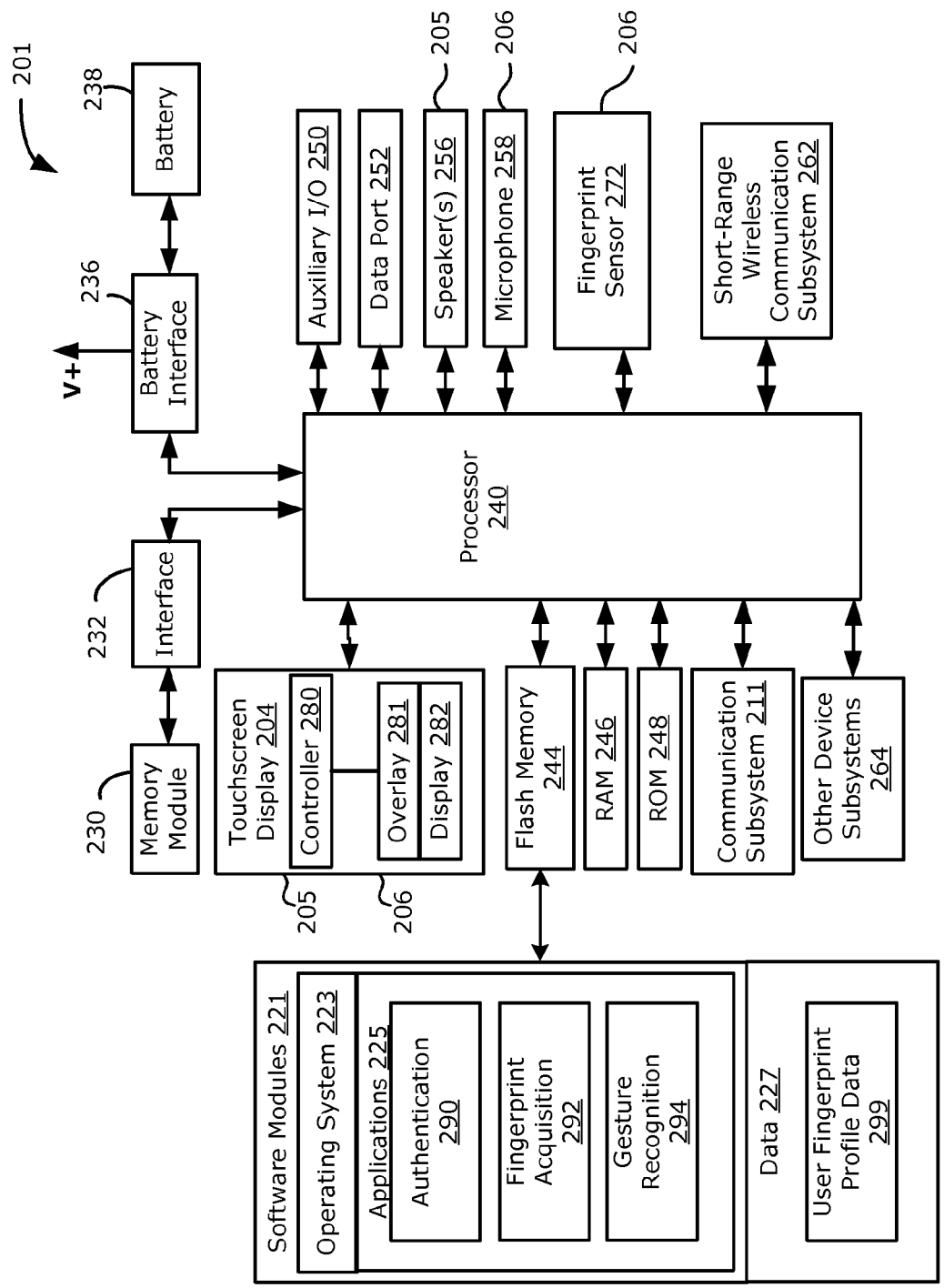
FIG. 1 is a block diagram illustrating an example electronic device in accordance with example embodiments of the present disclosure.

In one example aspect, the present application describes an electronic device. The electronic device includes a touchscreen display and a fingerprint sensor adjacent the touchscreen display. The electronic device also includes one or more processors associated with processor-executable instructions. At least one of the processors is coupled with the touchscreen display and at least one of the processors is coupled with the fingerprint sensor. The instructions include gesture recognition instructions associated with one or more of the processors that is coupled with the touchscreen display. The gesture recognition instructions are configured to cause that processor to detect a gesture that is characterized by input representing movement that is directed at or from the fingerprint sensor. The input is received, at least in part, at an end of the touchscreen display that is nearest the fingerprint sensor. The instructions further include fingerprint acquisition instructions associated with one or more of the processors that is coupled with the fingerprint sensor. The fingerprint acquisition instructions are configured to cause that processor to obtain a fingerprint sample from the fingerprint sensor. The instructions further include fingerprint authentication instructions associated with one or more of the processors. The fingerprint authentication instructions are configured to cause that processor to authenticate a user based on the fingerprint sample obtained from the fingerprint sensor.

In another example aspect, the present application describes an electronic device. The electronic device includes a touchscreen display and a fingerprint sensor adjacent the touchscreen display. The electronic device further includes a gesture recognition component coupled with the touchscreen display. The gesture recognition component is configured to detect a gesture that is characterized by input representing movement that is directed at or from the fingerprint sensor. The input is received, at least in part, at an end of the touchscreen display that is nearest the fingerprint sensor. The electronic device further includes a fingerprint acquisition component coupled with the fingerprint sensor. The fingerprint acquisition component is configured to cause that processor to obtain a fingerprint sample from the fingerprint sensor.

In another example aspect, the present application describes a method implemented on a processor of an electronic device. The electronic device includes a touchscreen display and a fingerprint sensor adjacent the touchscreen display. The method includes: detecting a gesture that is characterized by input representing movement that is directed at or from the fingerprint sensor, the input being received, at least in part, at an end of the touchscreen display that is nearest the fingerprint sensor; obtaining a fingerprint sample from the fingerprint sensor; and authenticating a user based on the fingerprint sample obtained from the fingerprint sensor.

In yet another example aspect, a method is described that is implemented by a processor of an electronic device. The electronic device has one or more input interfaces associated with a predetermined gesture. The electronic device further including a fingerprint sensor placed in the path of the gesture. The method includes: determining that the predetermined gesture has been performed; receiving a fingerprint sample; and in response to determining that the predetermined gesture has been performed, performing a non-authentication function. In at least some embodiments, the non-authentication function is a function that is not related to the unlocking of the electronic device.

In yet another example aspect, an electronic device is described. The electronic device has one or more input interfaces associated with a predetermined gesture. The electronic device further includes a fingerprint sensor placed in the path of the gesture. The electronic device includes a processor that is configured for: determining that the predetermined gesture has been performed; receiving a fingerprint sample; and in response to determining that the predetermined gesture has been performed, performing a non-authentication function. In at least some embodiments, the non-authentication function is a function that is not related to the unlocking of the electronic device.

In yet another aspect, an electronic device is described. The electronic device has one or more input interfaces associated with a predetermined gesture. The electronic device further includes a fingerprint sensor placed in the path of the gesture. The electronic device includes a processor that is configured to: operate in an unsecured operating mode in which a secure function is enabled; receiving the predetermined gesture; receive a fingerprint sample; determine, based on the fingerprint sample, that a current user of the electronic device is an authorized user; and, in response to determining that the current user is an authorized user, continue operating in the unsecured operating mode. In at least some embodiments, the fingerprint sample is obtained without a prompt being first displayed requiring a user to input a fingerprint sample. In at least some embodiments, in response to determining that the current user is an authorized user, the electronic device continues to operate in the unsecured operating mode without displaying any indication that an authorization function has been performed.

In yet another aspect, a method is described for implementation on a processor of an electronic device. The electronic device has one or more input interfaces associated with a predetermined gesture. The electronic device further includes a fingerprint sensor placed in the path of the gesture. The method includes: operating in an unsecured operating mode in which a secure function is enabled; receiving the predetermined gesture; receive a fingerprint sample; determining, based on the fingerprint sample, that a current user of the electronic device is an authorized user; and, in response to determining that the current user is an authorized user, continue operating in the unsecured operating mode. In at least some embodiments, the fingerprint sample is obtained without a prompt being first displayed requiring a user to input a fingerprint sample. In at least some embodiments, in response to determining that the current user is an authorized user, the electronic device continues to operate in the unsecured operating mode without displaying any indication that an authorization function has been performed.

In yet another aspect, an electronic device is described. The electronic device includes a touchscreen display and an elongate fingerprint sensor having a length corresponding to a dimension of the touchscreen display. The fingerprint sensor is provided on the electronic device at a location in which a finger performing a gesture on the touchscreen display is likely to engage the fingerprint sensor.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

According to some example embodiments described herein, methods and devices are described in which a fingerprint sensor is placed in the path of a gesture which is associated with a function on an electronic device. The function is, in at least some embodiments, a function that is not related to authentication. For example, the function may involve displaying particular content on a display. That is, the gesture may be interpreted as a command to display particular content on a display; such as a recently received electronic message, in some examples. When a user performs the gesture in order perform the function, they may also engage the fingerprint sensor since the sensor is placed in a location in which it is likely to be engaged when the gesture is performed. Thus, a fingerprint sample may be captured unobtrusively. In some embodiments, such capture may be performed unbeknownst to the user. For example, the fingerprint sample is, in at least some embodiments, captured without any prompt first being displayed to a user to suggest to the user that a fingerprint sample is required. Since the fingerprint sensor is placed in the path of the gesture, authentication of the user based on the fingerprint may be performed as a background process while the user is doing other things on the device.

Example Electronic Device

An overview of some example embodiments having been provided, reference will now be made to FIG. 1, which illustrates an example electronic device 201 in which example embodiments described in the present disclosure can be applied. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments the electronic device 201 may be a multiple-mode communication device configured for both data and voice communication, a mobile telephone such as a smartphone, a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device 201 includes a controller including at least one processor 240 (such as a microprocessor) which controls the overall operation of the electronic device 201. The processor 240 interacts with device subsystems such as a communication subsystem 211 which may be a wireless communication subsystem configured for exchanging radio frequency signals with a wireless network to perform communication functions. The processor 240 may be communicably coupled with additional device subsystems including one or more output interfaces 205 (such as a display 282 (which may be part of a touchscreen display 204) and/or a speaker 256), one or more input interfaces 206 (such as a camera, a microphone 258, a keyboard (not shown), control buttons (not shown), a touch-sensitive overlay 281 associated with a touchscreen display 204, a fingerprint sensor 272 and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range wireless communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display 204 which acts as both an input interface 206 (i.e. touch-sensitive overlay 281) and an output interface 205 (i.e. display 282). The touchscreen display may be constructed using a touch-sensitive input surface (referred to as a touch-sensitive overlay 281) which is connected to an electronic controller 280 and which overlays the display 282. The touch-sensitive overlay 281 and the electronic controller 280 provide a touch-sensitive input interface 206 and the processor 240 interacts with the touch-sensitive overlay 281 via the electronic controller 280.

The electronic device 201 may include a communication subsystem 211 which allows the electronic device 201 to communicate over a network, such as a wireless network. The particular design of the communication subsystem 211 depends on the wireless network in which the electronic device 201 is intended to operate.

As noted above, the electronic device may include auxiliary input/output (I/O) subsystems 250. The auxiliary I/O subsystems 250 may include an Ethernet connection in some embodiments. In some embodiments, the auxiliary I/O subsystems 250 may include a vibrator for providing vibratory notifications in response to various events on the electronic device 201 such as receipt of an electronic communication or incoming phone call, or for other purposes such as haptic feedback (touch feedback).

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network. The alternate download path may for example, be used to load an encryption key onto the electronic device 201 through a direct, reliable and trusted connection to thereby provide secure device communication.

The electronic device 201 also includes a fingerprint sensor 272. The fingerprint sensor 272 is configured to capture a fingerprint sample of a user when that user's finger engages the fingerprint sensor 272. The fingerprint sample includes fingerprint data representing the fingerprint of the user. The fingerprint data may, for example, specify a fingerprint pattern of the user. The fingerprint sensor 272 may, for example, be a capacitance sensor fingerprint sensor 272. In a capacitance sensor fingerprint sensor 272, pixels of a sensor array each act as one plate of an effective parallel-plate capacitor. The dermal layer of the user's finger acts as the other plate and the epidermal layer acts as a dielectric. Capacitance sensors can be passive or active. Passive sensors use measured capacitance to distinguish between ridges and valleys on the finger. Active sensors apply a voltage to the skin of the finger before taking the measurements, which charges the effective capacitor, creating an electric field that follows the pattern of ridges on the skin. The voltage across the dermal layer and the sensor array on the discharge cycle is compared to a reference voltage to calculate capacitance and thus distinguish between ridges and valleys. In other embodiments, the fingerprint sensor 272 is an RF-based sensor. In other embodiments, the fingerprint sensor 272 is an optical sensor. Optical sensors capture a digital image of the finger that is touching the sensor. In still other embodiments, the fingerprint sensor 272 is an ultrasonic sensor, which uses measurements from reflected high frequency sound waves to form an image of the fingerprint.

The fingerprint sensor 272 is coupled to at least one processor 240 or controller that is configured to control the fingerprint sensor 272. More particularly, the processor 240 that is connected to the fingerprint sensor 272 contains processor-executable instructions which, when executed, cause the processor to obtain a fingerprint sample from the fingerprint sensor 272 when a finger contacts the fingerprint sensor 272. These processor-executable instructions may be referred to as fingerprint acquisition instructions 292. The processor 240 that is configured to perform the fingerprint acquisition features described herein may be referred to as a fingerprint acquisition component. In the embodiment illustrated, the main processor 240 of the electronic device 201 is coupled with the fingerprint sensor 272 and is configured to perform the fingerprint acquisition features described herein.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network is automatically routed to the electronic device 201 using the USB cable or Bluetooth® connection. Similarly, any traffic destined for the wireless network is automatically sent over the USB cable or Bluetooth® connection to the host computer system for processing.

The electronic device 201 also includes a power source such as a battery 238, which may include one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information used by the electronic device 201 to establish and maintain communication with the wireless network. The data 227 may also include user application data such as email messages, address book and contact information, camera data, calendar and schedule information, notepad documents, image files, and other commonly stored user information stored on the electronic device

201 by its user, and other data. In at least some embodiments, the data 227 includes user fingerprint profile data 299. The user fingerprint profile data 299 may include one or more fingerprint samples associated with a user. A fingerprint sample includes fingerprint data that electronically represents a user's fingerprint. More particularly, the stored fingerprint samples represent the fingerprint of an authorized user of the electronic device 201. The authorized user of the electronic device 201 is, in some embodiments, a person who is authorized to use the electronic device 201. In such embodiments, unauthorized users are users who do not have associated fingerprint data stored in memory and who are not permitted to use the electronic device 201. In other embodiments, an authorized user of the electronic device 201 is a person who is authorized to use one or more predetermined features of the electronic device 201 and an unauthorized user is a person who is not permitted to use the one or more predetermined features. Such predetermined features may include for example, the ability to place a telephone call, make a long distance telephone call, use the Internet, access a secure area of memory of the electronic device or a secure program associated with the electronic device.

The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the memory.

The electronic device 201 may, in at least some example embodiments, be a mobile communication device which may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by an email messaging application and output to the display 204. A user of the electronic device 201 may also compose data items, such as email messages, for example, using an input interface 206 in conjunction with the display 282 (such as the touch-sensitive overlay 281). These composed items may be transmitted through the wireless communication subsystem 211 over the wireless network.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 282 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225.

The software applications 225 on the electronic device 201 may also include a range of additional applications including, for example, a notepad application, internet browser application, a camera application, a voice communication (i.e. telephony) application, a mapping application, and/or a media player application, or any combination thereof. Each of the software applications 225 may include layout information defining the placement of particular fields and graphic elements (e.g. text fields, input fields, icons, etc.) in the user interface (e.g. the display 282) according to the application.

The software modules 221 include processor-executable instructions which, when executed, cause the processor 240 and/or other modules to perform predetermined functions. In the example illustrated, these processor-executable instructions include gesture recognition instructions 294, fingerprint acquisition instructions 292 and authentication instructions 290. The gesture recognition instructions 294 are configured to determine, based on input received via the touch-sensitive overlay 281 of the touchscreen display 204, whether one or more predetermined gestures has been performed. In at least some embodiments, the gesture recognition instructions 294 are configured to cause the processor 240 to detect a gesture that is characterized by input representing movement that is directed at or from the fingerprint sensor 272 and that is received, at least in part, at an end of the display 282 that is nearest the fingerprint sensor 272. Example gestures that may be detected will be described in greater detail below with reference to FIGS. 2 to 5.

The fingerprint acquisition instructions 292 are configured to cause the processor to obtain fingerprint samples from the fingerprint sensor 272. The processor associated with the fingerprint acquisition instructions may, therefore, act as a controller for the fingerprint sensor 272.

The authentication instructions 290 are configured to cause the processor to authenticate a user of the electronic device 201 based on the fingerprint sample obtained from the fingerprint sensor 272. That is, the authentication instructions 290 are configured to use the fingerprint sample and user fingerprint profile data 299 stored in memory to determine whether the current user of the electronic device 201 is an authorized user of the electronic device. More particularly, a comparison between the current user's fingerprint (as represented in the fingerprint sample) and that of the authorized user is performed to determine whether the current user is the same person as the authorized user. If the current user is an authorized user, then one or more features of the electronic device 201 that are available only to authorized users is enabled (such features may be referred to as "secure features") and/or the electronic device 201 itself may be enabled. By way of example, secure features may include the ability to make a telephone from the electronic device, make a long distance telephone from the electronic device, send an electronic message from the electronic device, access the Internet, access a secure area of memory, access a secure application, delete a file or application, or initiate a download or an upload of data. Other secure features may be provided in other embodiments. If the current user is not an authorized user, then the one or more secure features may be disabled and/or the electronic device itself may be disabled.

The authentication instructions 290 are, in at least some embodiments, configured to operate as a background process (i.e. performed while the device appears to be doing other things). More particularly, a fingerprint sample may be captured passively. The fingerprint sensor 272 may be captured when a user happens to place their finger over the fingerprint sensor 272. When a user performs a gesture in order perform a function associated with that gesture, they may also engage the fingerprint sensor 272 since the sensor is placed in a location in which it is likely to be engaged when the gesture is performed. In response, a fingerprint sample is obtained. In some embodiments, such capture may be performed unbeknownst to the user. For example, the fingerprint sample is, in at least some embodiments, captured without any prompt first being displayed to a user to suggest to the user that a fingerprint sample is required. Since the fingerprint sensor 272 is placed in the path of the gesture, authentication of the user based on the fingerprint may be performed as a background process while the user is doing other things on the device.

The gesture recognition instructions 294, the fingerprint acquisition instructions 292 and the authentication instructions 290 are illustrated as being associated with a common processor 240 which, in the example embodiment, is the main processor of the electronic device 201. It will, however, be appreciated that processing may be divided among a plurality of processors. Accordingly, any one or more of the gesture recognition instructions 294, the fingerprint acquisition instructions 292 and/or the authentication instructions 290 may be associated with separate processors or components, apart from the main processor 240. For example, one or more application-specific processors may be used in order to off-load some of the processing capacity from the main processor. The gesture recognition instructions 294 are, however, typically associated with a processor that is coupled with the touchscreen display 204 to allow that processor to interpret input received via the touch-sensitive overlay 281 as one or more gestures. The processor that is associated with the gesture recognition instructions 294 may be referred to as a gesture recognition component.

Similarly, the fingerprint acquisition instructions 292 are typically associated with a processor that is coupled with the fingerprint sensor 272 to allow that processor to interpret input received via the fingerprint sensor 272. The processor that is associated with the fingerprint acquisition instructions 292 may be referred to as a fingerprint acquisition component.

In the example shown, the main processor 240 is coupled with both the fingerprint sensor 272 and the touchscreen display 204, allowing it to execute both the fingerprint acquisition instructions 292 and the gesture recognition instructions 294. Thus, in this example, the main processor 240 acts as both the gesture recognition component and the fingerprint acquisition component.

Furthermore, while the authentication instructions 290, the fingerprint acquisition instructions 292 and the gesture recognition instructions 294 are illustrated as being separate from the operating system 223, in some embodiments, one or more of these instructions may be provided in the operating system 223.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

Front View of Example Electronic Device

As discussed above, the electronic device 201 may take a variety of forms. For example, in at least some example embodiments, the electronic device 201 may be a smartphone or a tablet.

Figure 2:
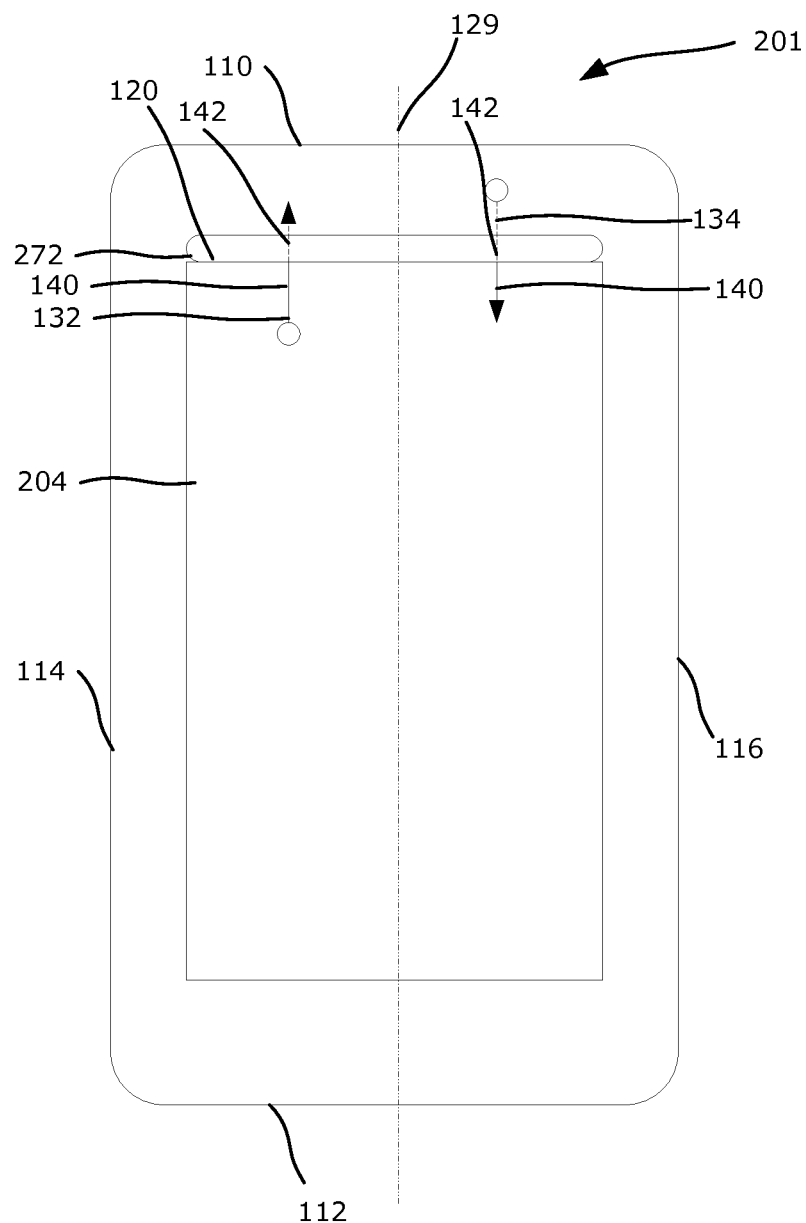
FIG. 2 is a front view of an example electronic device in accordance with example embodiments of the present disclosure.

Referring to FIG. 2, a front view of an example electronic device 201 is illustrated. The example electronic device 201 includes a touchscreen display 204. The example touchscreen display 204 is provided on the front face of the electronic device 201. The touchscreen display 204 is centrally positioned on the front face of the electronic device 201. That is, the touchscreen display 204 has a center point that is positioned equidistant from a left side 114 and a right side 116 of the electronic device 201 (i.e. it is horizontally centered). In the example illustrated, the center point of the touchscreen display 204 is also positioned equidistant from a top side 110 and a bottom side 112 of the electronic device 201 (i.e. it is vertically centered); however, in other example embodiments, the touchscreen display 204 may not be vertically centered. In the example embodiment, the touchscreen display 204 is rectangular in shape.

A fingerprint sensor 272 is disposed on the electronic device 201 adjacent the touchscreen display 204. In the example illustrated, the fingerprint sensor 272 is immediately adjacent the touchscreen display 204. That is, the fingerprint sensor 272 abuts the touchscreen display 204 such that no gap, or a very small gap, exists between the display and the fingerprint sensor 272. In at least some embodiments, the fingerprint sensor 272 and the display are separated by a gap that is less than one millimeter (i.e. the distance between the fingerprint sensor 272 and the nearest end 120 of the display 204 is less than 1 mm). The small size of the gap increases the likelihood that the fingerprint sensor 272 is engaged while a gesture is being performed using the touchscreen display 204. That is, by positioning the fingerprint sensor 272 immediately adjacent to the touchscreen display 204, a gesture performed on the touchscreen display 204 causes incidental contact with the fingerprint sensor 272. More particularly, a finger performing a gesture near an end 120 of the display that is near the fingerprint sensor 272 may incidentally engage the fingerprint sensor 272. By positioning the fingerprint sensor 272 in such close proximity to the display, fingerprint samples may be acquired during inadvertent contact with the fingerprint sensor 272.

In the embodiment illustrated, the fingerprint sensor 272 is positioned adjacent to the top end 120 of the touchscreen display 204 (i.e. near the top side 110 of the electronic device 201). However, it will be appreciated that the fingerprint sensor 272 may be positioned on other sides of the electronic device 201 in other embodiments.

In some embodiments (not shown) in order to increase the likelihood of engaging a fingerprint sensor 272 through contact that is incident while performing a gesture, a plurality of fingerprint sensors 272 may be provided on the electronic device 201. Each fingerprint sensor 272 may be provided on a different side of the display (i.e. near a different side of the electronic device 201). For example, a first fingerprint sensor may be disposed on a first side of the display (and near a first side of the electronic device 201) and a second fingerprint sensor may be disposed on a second side of the display (and near a second side of the electronic device 201). In some embodiments, a third fingerprint sensor may also be disposed on a third side of the display (and near a third side of the electronic device 201). In some embodiments, a fourth fingerprint sensor may also be included. The fourth fingerprint sensor may be located near a fourth side of the display (and near a fourth side of the electronic device 201). Thus, in at least some embodiments, a separate fingerprint sensor 272 is associated with each side of the electronic device 201.

In the embodiment illustrated, the fingerprint sensor 272 is aligned with the touchscreen display 204. More particularly, the fingerprint sensor 272 and the touchscreen display 204 are centered about a common axis 129 which, in the embodiment illustrated, is an axis 129 that runs midway between the left side 114 and the right side 116 of the electronic device 201 and midway between right and left sides of the fingerprint sensor 272 and midway between right and left side of the touchscreen display 204.

In the embodiment illustrated, the fingerprint sensor 272 is an elongate fingerprint sensor 272. The length of the fingerprint sensor 272 may correspond to a dimension of the touchscreen display 204. For example, the length of the fingerprint sensor 272 may be the same or approximately the same (i.e. within 10% difference) as the length of the side of the display that is adjacent to the fingerprint sensor 272. For example, in the embodiment illustrated the fingerprint sensor 272 is adjacent to a top end 120 of the touchscreen display 204. In this example, the fingerprint sensor 272 has a length that corresponds to that of the top end 120. More particularly, in the example illustrated, the length of the fingerprint sensor 272 corresponds to the width of the touchscreen display 204. Since the length of the fingerprint sensor 272 corresponds to the length of the side of the display that is nearest the fingerprint sensor 272, the likelihood of engaging the fingerprint sensor 272 through incidental contact while performing a gesture on the touchscreen display 204 is increased.

Accordingly, a finger of a user's hand (not shown) may engage the fingerprint sensor 272 while a gesture is being performed on the touchscreen display 204. An example of how this might occur will be discussed with reference to example gestures 132, 134. These gestures 132, 134 are illustrated using a circle which illustrates an initial point of contact and a line with an arrow to indicate the directions of movement associated with each gesture 132, 134. This manner of illustration is used throughout the figures to denote gestures.

A gesture recognition component 294 (FIG. 1) associated with the electronic device 201 may be configured to recognize predetermined gestures 132, 134. More particularly, gesture recognition instructions 294 (FIG. 1) that are associated with one or more processors 240 (FIG. 1) of the electronic device 201 that are coupled with the touchscreen display 204, may be configured to cause at least one of those processors to detect a gesture 132, 134 that is characterized by input representing movement that is directed at (in the case of gesture 132) the fingerprint sensor 272 or that is directed away (in the case of gesture 134) from the fingerprint sensor 272. That is, the gestures 132, 134 are characterized by movement that is directed away from the fingerprint sensor or that is characterized by movement that is directed towards the fingerprint sensor 272. The gestures are, in at least some embodiments, swipe gestures. The movement associated with the gestures 132, 134 includes an on-screen component 140 and an off-screen component 142 (which is illustrated in FIG. 2 using a broken line to distinguish from the on-screen component 140 which is illustrated using a solid line). The on-screen component 140 is the portion of the movement that engages the touchscreen display 204. The off-screen component 142 is the portion of the movement that does not engage the touchscreen display 204. Since the on-screen component 140 consists of movement that contacts the touchscreen display 204, the on-screen component produces an input at the touchscreen display 204 which may be analyzed in order to determine that the gesture has been performed. The off-screen component 142 is, in at least some embodiments, not used for the purpose of gesture detection. The off-screen component 142 illustrates how incidental contact with the fingerprint sensor 272 may be caused due to the performance of a gesture.

As illustrated, the gestures 132, 134 are also characterized by input received at the end 120 of the touchscreen display 204 that is nearest the fingerprint sensor 272. That is, when the gesture 132, 134 is performed, the on-screen component 140 of the movement engages the end 120 of the touchscreen display 204 so that incidental contact with the fingerprint sensor 272 is likely.

The first gesture 132 that is illustrated is a swipe-towards-fingerprint-sensor gesture. This gesture is characterized by input representing a swipe in the direction of the fingerprint sensor 272. That is, the on-screen component 140 of the movement associated with the gesture is directed at the fingerprint sensor 272. The first gesture 132 is characterized by movement between a portion of the touchscreen display 204 that is away from the fingerprint sensor 272 to a portion of the touchscreen display 204 that is immediately adjacent to the fingerprint sensor 272.

The second gesture 134 that is illustrated is a swipe-from-fingerprint-sensor gesture. This gesture is characterized by input representing a swipe away from the fingerprint sensor 272. That is, the on-screen component 140 of the movement associated with the gesture is directed away from the fingerprint sensor 272. The second gesture 134 is characterized by movement between a portion of the touchscreen display that is immediately adjacent to the fingerprint sensor 272 to a portion of the touchscreen display that is away from the fingerprint sensor 272.

The fingerprint sensor 272 may be incidentally engaged while either the first gesture 132 or the second gesture 134 is being performed. When the first gesture 132 is performed, the fingerprint sensor 272 may be engaged after the display is engaged. In contrast, when the second gesture is performed, the fingerprint sensor 272 may be engaged before the display is engaged. Accordingly, the gestures 132, 134 may involve movement that engages both the touchscreen display 204 and the fingerprint sensor 272.

The gesture may be associated with a function apart from authentication. That is, the gesture may be associated with a function on the electronic device 201 that is unrelated to authentication. One or more of the processors 240 of the electronic device 201 may be associated with instructions that cause one or more of the processors 240 to perform at least one function apart from authentication of a fingerprint sample in response to detecting the gesture. That is, the gesture is performed in order to cause the electronic device 201 to do something else such as, for example, to scroll a displayed page, display a message, etc. For example, in some embodiments, the first gesture 132 and/or the second gesture 134 illustrated in FIG. 2 may be associated with a scroll command. Accordingly, the gesture 132, 134 is being used for a purpose that is unrelated to the authentication, but a fingerprint sample is acquired (and possibly authenticated) due to the incidental contact with the fingerprint sensor 272 that is caused by performance of the gesture 132, 134.

As noted above, in some embodiments, gestures are performed which do not require contact with the fingerprint sensor 272 but which cause incidental contact with the fingerprint sensor due to the nature of the gesture and/or the arrangement and configuration of the fingerprint sensor 272. In other embodiments, contact with the fingerprint sensor 272 may be necessary (and not incidental) to the performance of the gesture. More particularly, in some embodiments, the gesture recognition instructions 294 (FIG. 1) may cause a processor 240 (FIG. 1) that is coupled with the fingerprint sensor 272 and also with the touchscreen display 204 to utilize input from both the touchscreen display 204 and the fingerprint sensor 272 for the purpose of gesture identification. That is, the gesture recognition instructions 294 cause the processor 240 to determine that the gesture 132, 134 has been performed based on input received at the fingerprint sensor 272 and the touchscreen display 204. In some such embodiments, the gesture that is identified may be referred to as an off-screen swipe gesture since such a gesture requires a portion of the movement to be performed off-screen. By way of example, in some embodiments, the gesture recognition instructions may cause the processor to recognize an off-screen swipe gesture if the following conditions are determined to be satisfied: 1) a swipe-towards-fingerprint-sensor gesture is detected based on input received from the touchscreen display 204; and 2) the fingerprint sensor 272 is engaged within a predetermined threshold of time following the swipe-towards-fingerprint-sensor gesture. By way of further example, in some embodiments, an off-screen swipe gesture may be recognized if the following conditions are determined to be satisfied: 1) the fingerprint sensor 272 is engaged; and 2) a swipe-from-fingerprint-sensor gesture is detected based on input received from the touchscreen display 204 within a predetermined threshold of time after the fingerprint sensor 272 was engaged.

Thus, in such embodiments, the fingerprint sensor 272 serves a dual purpose—it is used for fingerprint acquisition for authentication purposes and it is used as an input device for gesture recognition purposes.

It will be appreciated that FIG. 2 illustrates an external face of the electronic device 201 and that other components will be included on the electronic device 201 that may not be visible from the outside of the electronic device 201. For example, the electronic device 201 may have the components described above with reference to FIG. 1.

Furthermore, while FIG. 2 generally described gestures which where input on a single device, in other embodiments, the gesture recognition component 294 (FIG. 1) associated with the electronic device 201 may be configured to recognize predetermined gestures that engage a plurality of electronic devices. For example, the electronic device may be configured to recognize a gesture that is characterized by a swipe from a touchscreen display of one of the electronic devices to a touchscreen display of the other of the electronic devices. Since at least one of the electronic devices includes a fingerprint sensor 282 that is adjacent to the touchscreen display of that device, the multi-device swipe may engage the fingerprint sensor 282. When this happens, a fingerprint sample may be acquired. Thus, in at least some embodiments, a multi-device swipe gesture may be defined which causes incidental contact with the fingerprint sensor, thereby allowing a fingerprint sample to be acquired.

Front View of Further Example Electronic Device

Figure 3:
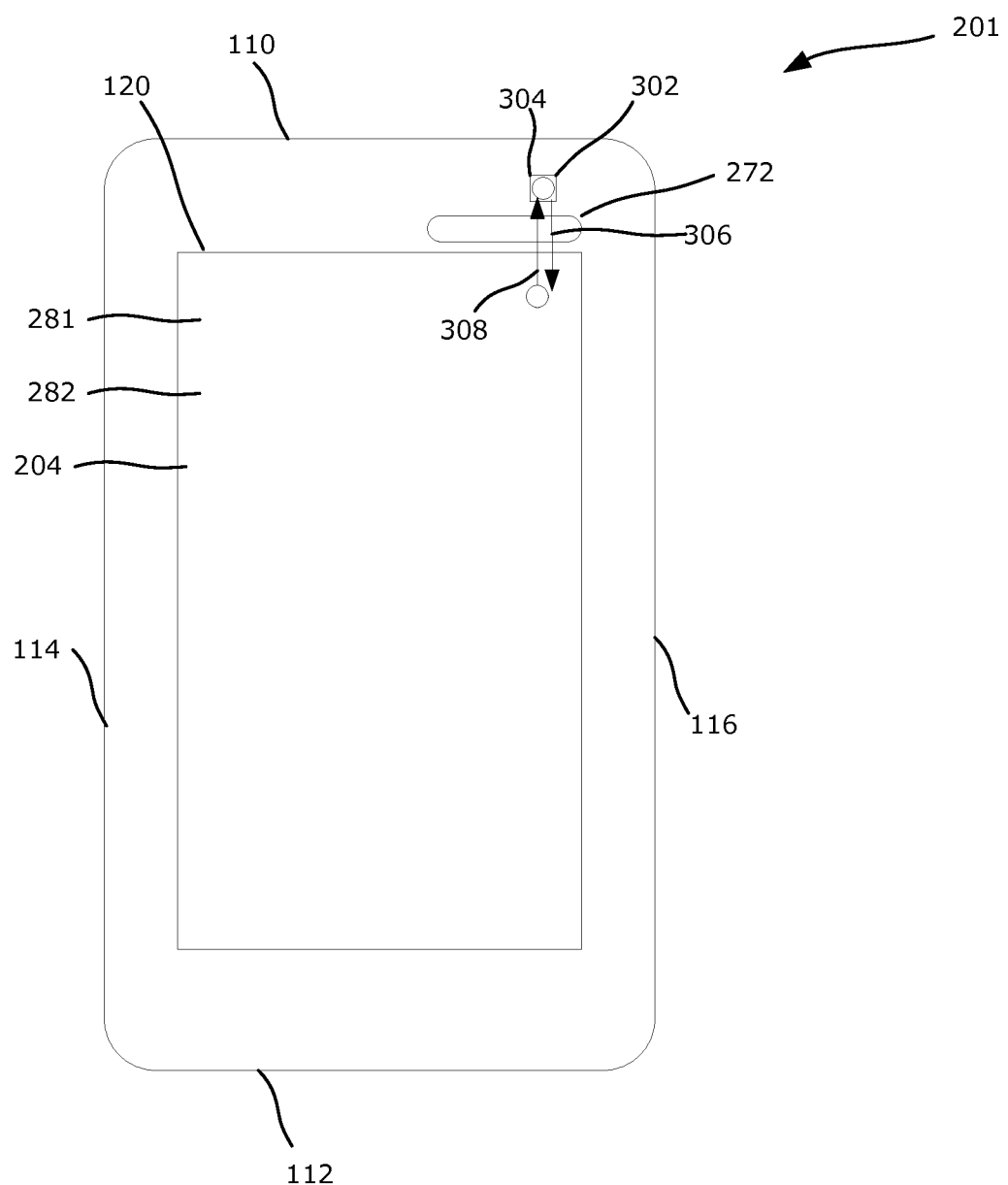
FIG. 3 is a front view of an example electronic device in accordance with further example embodiments of the present disclosure.

Referring now to FIG. 3, a front view of an alternative electronic device 201 is illustrated. The electronic device 201 illustrated in FIG. 3 has a number of features in common with the example electronic device 201 of FIG. 2. Common reference numerals are used to denote similar components.

In the example of FIG. 3, a touchscreen display 204 is provided on the front face of the electronic device 201. The touchscreen display 204 is, in the example, centrally positioned on the front face of the electronic device 201 and is rectangular in shape. That is, the touchscreen display 204 has a center point that is positioned equidistant from a left side 114 and a right side 116 of the electronic device 201 (i.e. it is horizontally centered). In the example illustrated, the center point of the touchscreen display 204 is also positioned equidistant from a top side 110 and a bottom side 112 of the electronic device 201 (i.e. it is vertically centered); however, in other example embodiments, the touchscreen display 204 may not be vertically centered. In the example embodiment, the touchscreen display 204 is rectangular in shape.

A fingerprint sensor 272 is disposed on the electronic device 201 adjacent the touchscreen display 204. In some embodiments, the fingerprint sensor 272 may be positioned immediately adjacent to the touchscreen display 204. That is, in some embodiments the fingerprint sensor 272 abuts the touchscreen display 204 such that no gap, or a very small gap, exists between the display and the fingerprint sensor 272. As noted in the discussion of FIG. 2 above, this allows the fingerprint sensor 272 to be engaged through incidental contact while a gesture is being performed on the touchscreen display 204. As will be described in greater detail below, the embodiment of FIG. 3 uses a further technique in order to increase likelihood of contact with the fingerprint sensor 272 (i.e. a technique apart from the small gap). Thus, in at least some embodiments, a larger gap may exist between the touchscreen display 204 and the fingerprint sensor 272.

In the example illustrated, the fingerprint sensor 272 is located adjacent to the top end 120 of the touchscreen display 204. However, other orientations are possible.

As noted previously in the discussion of FIG. 1, the touchscreen display 204 may be include a display 282 (FIG. 1) and an input component (which may be referred to as a first input component) which is touch-sensitive. This input component may be referred to as a touch-sensitive overlay 281.

As noted above, the embodiment in FIG. 3 uses a further technique in order increase the likelihood of contact with the fingerprint sensor 272. More particularly, an indicator 302 and/or a second input component 304 is/are disposed on a side of the fingerprint sensor 272 that is opposite the side of the fingerprint sensor 272 that is nearest the touchscreen display 204. That is, in embodiments in which the indicator 302 is included, the fingerprint sensor 272 may be located between the indicator 302 and the touchscreen display 204. Similarly, in embodiments in which the second input component 304 is included, the fingerprint sensor 272 may be located between the second input component 304 and the touchscreen display 204.

Similar to the electronic device 201 described with reference to FIG. 2, the electronic device 201 of FIG. 3 may include gesture recognition instructions 294 (FIG. 1) which are associated with at least one processor 240 that is coupled with the touchscreen display 204. The gesture recognition instructions 294 are configured to cause that processor 240 to detect a gesture 306, 308 that is characterized by input representing movement that is directed at or from the fingerprint sensor 272. This input is received, at least in part, at an end 120 of the touchscreen display 204 that is nearest the fingerprint sensor 272.

A second input component 304 is a component that is capable of receiving input. In at least some embodiments, the second input component 304 is a touch-sensitive input component that is configured to receive input in response to touch-based activation. Such input may be provided (in the form of electrical signal representing input received at the second input component) to a processor 240 associated with the gesture recognition instructions 294 (FIG. 1) and used in order to identify a gesture 306, 308. That is, in embodiments in which a second input component 304 is used, the gesture recognition instructions 294 may be configured to cause the processor 240 associated with the gesture recognition instructions 294 to use both input received from the touchscreen display 204 and input received from the second input component 304 in order to detect a gesture 306, 308. The gesture may require interaction with both the touchscreen display 204 (which acts as a first input component due to the presence of the touch-sensitive overlay 281) and the second input component 304. That is, the gesture 306, 308 is characterized by movement that engages both the first input component and the second input component. For example, in at least some embodiments, the gesture 308 may be a swipe gesture that begins at the touchscreen display 204 and that ends at the second input component 304. Or, a gesture 306 may occur along the reverse path; a swipe begins at the second input component 304 and ends at the touchscreen display 204. Since the fingerprint sensor 272 is located between the touchscreen display 204 and the second input component 304, the fingerprint sensor 272 is activated when the gesture is performed. That is, while performing the gesture the fingerprint sensor 272 is activated as the finger of a user travels from the touchscreen display 204 to the second input component 304 (or vice versa) passing over top of the fingerprint sensor 272 along the way.

Thus, the gesture recognition instructions 294 may, in at least some embodiments, define a swipe gesture between the touchscreen device 204 and the second input component 304. Due to the arrangement of the fingerprint sensor 272, the touchscreen device 204 and the second input component 304, the fingerprint sensor 272 is activated during performance of the gesture. Thus, a fingerprint sample is acquired during performance of the gesture.

In some embodiments, the second input component 304 functions as an indicator 302. An indicator 302 is a component that is used to convey information. For example, the second input component 304 may be used to indicate a status of the electronic device 201 and/or to convey other information to a user. Thus, the second input component 304 may be an output device. For example, in at least some embodiments, the second input component 304 may be a second touchscreen display.

As with the gestures discussed with reference to FIG. 2, the gesture(s) 306, 308 of FIG. 3 may be associated with a function apart from authentication. That is, the gesture 306, 308 may be associated with a function on the electronic device 201 that is unrelated to authentication. Where the gesture 306, 308 is based on movement that is directed at or from an indicator, the function associated with the gesture may depend of the indicator. For example, a swipe from an indicator 302 to the touchscreen display 204 may be used to cause the touchscreen display 204 to display content associated with the indicator 302. For example, the indicator 302 may be set to a particular state when a new electronic message is received at the electronic device 201 (e.g. if the indicator 302 is a display it may display an indication that a new message has arrived such as "New Message" and/or may display some information about the message; for example, "E-mail from Jeff"). In such embodiments, a gesture which is a swipe gesture from the indicator 302 to the touchscreen display 204 may cause the associated message to be opened and displayed on the touchscreen display 204.

In some embodiments, an indicator 302 may be used that is not an input device. That is, an indicator 302 may be used that does not also function as a second input component 304. In some such embodiments, the gesture recognition instructions 294 (FIG. 1) may cause an associated processor 240 to recognize a swipe between the touchscreen display 204 and the indicator 302 based only on the input received at the touchscreen display 204. For example, the gesture recognition instructions 294 are configured to effectively know the location of the indicator 302 relative to the touchscreen display 204. That is, the indicator 302 is associated with a predetermined location (i.e. relative to the touchscreen display 204), which is known to the gesture recognition instructions 294. The gesture recognition instructions 294 may, therefore, configure a processor 240 to determine whether a swipe-from-indicator gesture 306 (which may also be referred to as a swipe-from-predetermined-location gesture) has been performed. This gesture 306 is characterized by input representing movement having a trajectory that indicates that the movement originated from the predetermined location associated with the indicator 302. Thus, the trajectory of a swipe gesture received at the touchscreen display 204 that begins at the end 120 of the touchscreen display 204 may be analyzed to determine whether the trajectory of the movement suggests that the movement originated at the location associated with the indicator 302.

Similarly, the gesture recognition instructions 294 may configure a processor 240 to determine whether a swipe-towards-indicator gesture 308 (which may also be referred to as a swipe-towards-predetermined-location gesture) has been performed. This gesture 308 is characterized by input representing movement having a trajectory that indicates that the movement will pass from the touchscreen display 204 to the indicator 302 (i.e. to the predetermined location associated with the indicator 302). Thus, the trajectory of a swipe gesture received at the touchscreen display that ends at the end 120 of the touchscreen gesture may be analyzed to determine whether the trajectory of the movement suggests that the movement will continue on to the location associated with the indicator.

Thus, the gesture recognition instructions 294 (FIG. 1) may be configured to use a trajectory-based analysis to determine whether a gesture 306, 308 associated with both the touchscreen display 204 and a separate indicator 302 has been performed. This analysis may extrapolate the path of the movement indicated by the touchscreen input to determine whether the movement is likely to intersect the indicator 302. This analysis may, for example determine an angle of the movement received at the very end of the display 204 and may also, in some embodiments, consider the velocity of the movement (i.e. to determine whether the movement is likely to continue the distance to the indicator 302 or end before reaching the indicator 302).

This trajectory-based analysis that only relies on input from the touchscreen display 204 may be used, for example, when an indicator 302 is used that does not function as an input component (i.e. when it is an indicator 302 and not a second input component 304). As noted above, if the indicator 302 functions as an input component, then the input associated with the indicator 302 (i.e. the input from the second input component 304) may be used together with the input from the touchscreen display 204 to determine whether the gesture 306, 308 has been performed.

The indicator 302 is located at a predetermined location on the electronic device 201 that is opposite the side of the fingerprint sensor 272 that is nearest the touchscreen display 204. That is, indicator 302 and the touchscreen display 204 are at opposite sides of the fingerprint sensor 272. Thus, performance of the swipe-from-indicator gesture 306 or the swipe-towards-indicator gesture 308 is likely to cause contact with the fingerprint sensor 272.

The indicator 302 may take a variety of forms. For example, the indicator may be any one of: an output device, such as a secondary display (e.g. a micro display) or a light emitting diode (LED), a logo printed onto a surface of the electronic device 201, or an indicator 302 of another type. In some embodiments, the indicator 302 is an output device and a processor 240 coupled with the indicator is configured to change the state of the indicator when one or more predetermined criterion is satisfied. For example, upon receiving a new electronic message at the electronic device 201, the state of the indicator 302 may be updated to indicate to a user that the new message has been received. In at least some such embodiments, the gesture recognition instructions 294 are configured to cause at least one processor 240 to monitor for the swipe-from-indicator gesture when the state of the indicator 302 corresponds to a predetermined state. For example, if the state of the indicator 302 suggests that a new electronic message is available, the monitoring for the gesture may begin. Accordingly, in some embodiments, the monitoring for the swipe-from-indicator gesture may begin shortly after the state of the indicator is changed (e.g. to signify a new message).

In the example illustrated, the fingerprint sensor 272 is an elongate fingerprint sensor which has a length that is greater than the width of a typical human finger. The length of the fingerprint sensor 272 is also greater than the length of the indicator 302. In the example illustrated, the length of the fingerprint sensor 272 is less than the length of the touchscreen display 204 taken along the end 120 of the touchscreen display 204 nearest the fingerprint sensor 272. However, in other examples, the length of the fingerprint sensor 272 may correspond to the length of a dimension of the touchscreen display 204. For example, the fingerprint sensor 272 and the touchscreen display 204 may have a length relationship that corresponds to that illustrated in FIG. 2 and described above in the discussion of that figure.

It will be appreciated that FIG. 3 illustrates an external face of the electronic device 201 and that other components will be included on the electronic device 201 that may not be visible from the outside of the electronic device 201. For example, the electronic device 201 may have the components described above with reference to FIG. 1.

Further Example Electronic Device

Figure 4:
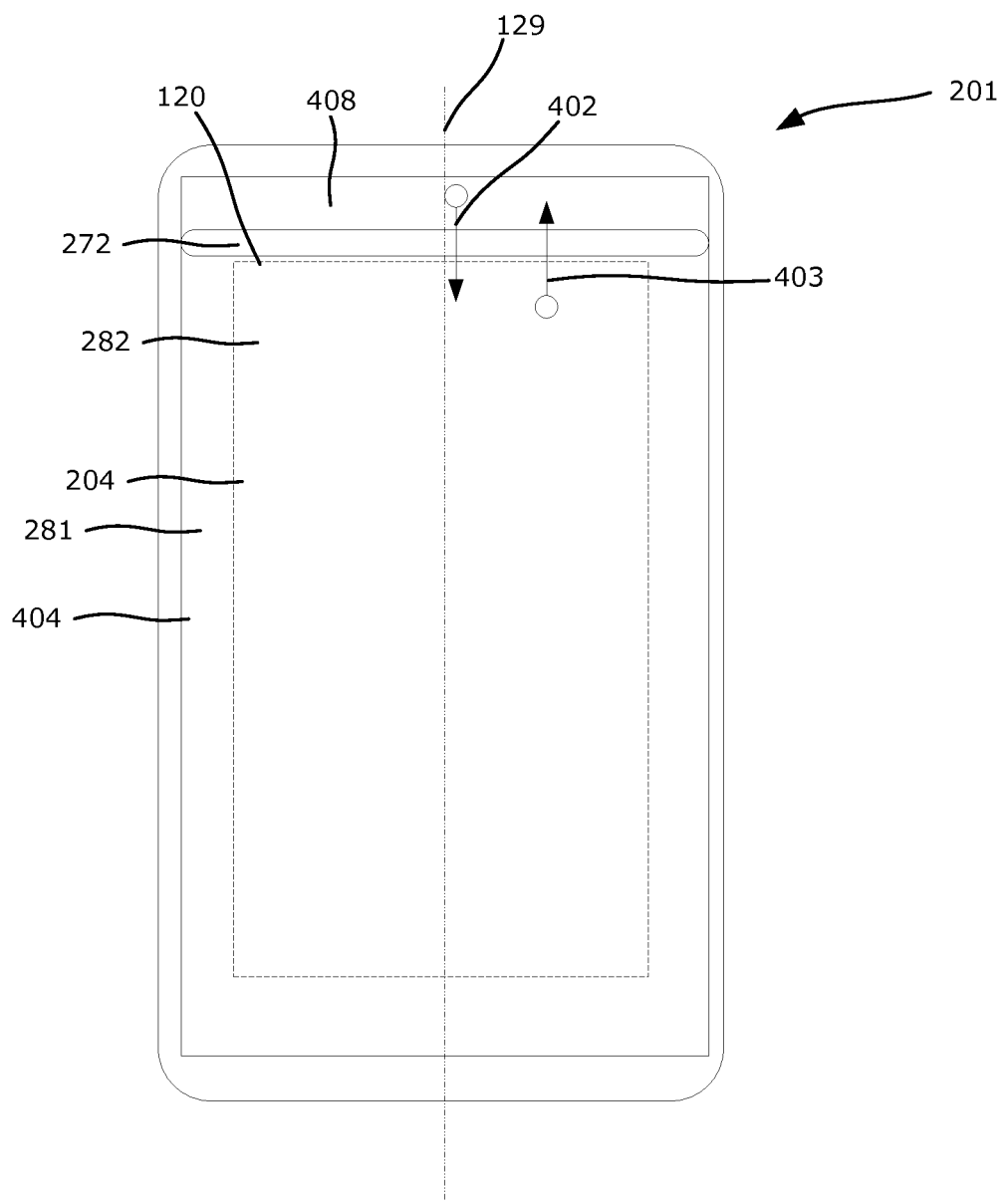
FIG. 4 is a front view of an example electronic device in accordance with further example embodiments of the present disclosure.

Referring now to FIG. 4, illustrated is a further example of an electronic device 201 which is arranged to acquire a fingerprint sample through incidental contact with a fingerprint sensor 272 while a gesture 402, 403 is being performed.

The electronic device 201 of FIG. 4 includes a touchscreen display 204 which is constructed of a display 282 (which acts as an output device) and a touch-sensitive overlay 281 (which acts as an input device). As with the embodiments of FIGS. 2 and 3, a fingerprint sensor 272 is included on the electronic device 201 at a location in which incidental activation is likely when a predetermined gesture is performed. More particularly, in this example, the fingerprint sensor 272 is mounted at a location which is adjacent to the display 282. In the example illustrated, the fingerprint sensor 272 is disposed on the electronic device 201 adjacent the end 120 of the display 282.

In this example, the electronic device 201 includes an active bezel 404. More particularly, a bezel 404 frames the display 282 associated with the touchscreen display 204. The bezel 404 is a frame for the display 282. The bezel 404 may, for example, be constructed of plastic or metal or of another suitable material. A surface of the bezel 404 may be flush with a surface of the display 282 and, in some embodiments, the bezel 404 and the touchscreen display 204 may share some components. For example, a common piece of glass may cover both the display 282 and the bezel 404.

The bezel 404 is "active" since at least a portion of the bezel 404 has a touch-sensitive overlay 281 associated therewith. The touch-sensitive overlay 281 is capable of receiving a touch-based input. That is, the touch-sensitive overlay 281 generates an electronic signal in response to touch-based activation. Example touch-sensitive technology is described above with reference to FIG. 1.

In the example illustrated, the touch-sensitive overlay 281 that is associated with the touchscreen display 204 extends over at least a portion of the bezel 404. That is, the size of the touch-sensitive overlay 281 is greater than the size of the display 204 so that it extends over a surface of the bezel 404. Thus, the touch-sensitive overlay 281 is used to provide input at locations associated with the display 282 and also at locations associated with the bezel 404. Since the touch-sensitive overlay 281 is located on top of the display 282 and the bezel 404, the display 282 has been illustrated with broken lines. However, it will be appreciated that the touch-sensitive overlay 281 is transparent and that the display 282 can, therefore, be viewed through the overlay 281.

Thus, at least a portion of the bezel 404 is touch-sensitive. The touch-sensitive portion of the bezel 404 may include a portion 408 which is located on a side of the fingerprint sensor 272 that is opposite the display 282. Accordingly, the electronic device 201 is touch-sensitive on two opposing sides of the fingerprint sensor 272 (one of these sides has the display 282 and one has a touch-sensitive portion 408 of the bezel 404).

One or more gestures 402, 403 may be defined by the gesture recognition instructions 294 (FIG. 1) to require contact on both of these opposing sides. More particularly, the gesture recognition instructions 294 may be configured to recognize a gesture 402, 403 that is characterized by a swipe involving both the bezel 404 (i.e. at the portion 408) and the display 282. That is, the gesture 402, 403 may be characterized by a swipe that travels between a location associated with the display 282 and a location that is associated with the portion 408 of the bezel 404 that is opposite the display 282; such a gesture causes a finger to pass over the fingerprint sensor 272 where a fingerprint sample is obtained.

For example, a first gesture 402 is a swipe-from-off-screen gesture. This gesture is characterized by a swipe movement that is initiated at the portion 408 of the bezel 404 that is on the side of the fingerprint sensor 272 that is opposite the display 282, and which then moves towards the display 282 travelling overtop of the fingerprint sensor 272 as it does so (where a fingerprint sample is obtained).

Similarly, a second gesture 403 is a swipe-to-off-screen gesture. This gesture is characterized by a swipe movement that is initiated at the display 282 (i.e. it first contacts the overlay 281 at a position associated with the display 282) which then moves towards the portion 408 of the bezel 404 that is on the side of the fingerprint sensor 272 that is opposite the display 282. In doing so, the finger performing the gesture travels overtop the fingerprint sensor 272, where a fingerprint sample is obtained. Both of these gestures 402, 403 may be detected using input from the touch-sensitive overlay 281.

As noted in the discussions of the previous example electronic devices of FIGS. 2 and 3, contact with the fingerprint sensor 272 is made while a finger is performing a gesture 402, 403 having an associated function that is unrelated to authentication. That is, in response to detecting the gesture 402, 403, the electronic device 201 may perform a non-authentication related function. Accordingly, the user may perform the gesture in order to perform a non-authentication function on the electronic device 201 and, while doing so, the electronic device 201 may acquire a fingerprint sample at the fingerprint sensor 272 and may utilize that fingerprint sample for some authentication-related activity. For example, when the fingerprint sample is acquired, the electronic device 201 may automatically update user fingerprint profile data 299 (FIG. 1) to build a fingerprint profile for the current user (i.e. this may be done if the electronic device is already in a state in which it is confident that the user is an authorized user, e.g. if the device has recently been unlocked by an authorized user). In some examples, when the fingerprint sample is acquired, the electronic device 201 may automatically authenticate the current user of the electronic device 201 based on the fingerprint sample and user fingerprint profile data 299 stored in memory.

In the example illustrated, the fingerprint sensor 272 is illustrated as being placed over top of the touch-sensitive overlay 281 and over top of the bezel 404. However, in other embodiments, the fingerprint sensor 272 may be provided in another way. For example, to avoid having a fingerprint sensor 272 that protrudes from the electronic device 201, an opening may be provided in the overlay 281 and the bezel 404 to allow the fingerprint sensor 272 to effectively have an exterior surface that is approximately flush with the touch-sensitive surface of the overlay 281.

In the example illustrated, the fingerprint sensor 272 is an elongate fingerprint sensor 272 having a length that corresponds to that of the touchscreen overlay 281. More particularly, in the example illustrated, the length of the fingerprint sensor 272 is approximately the same (e.g. within 10%) as the width of the touchscreen overlay 281. This length relationship provides a relatively large probability of contacting the fingerprint sensor 272 when performing a gesture 402, 403 of the type described above.

The length of the fingerprint sensor 272 may differ from the length of the touchscreen overlay in at least some embodiments. For example, in some embodiments (not shown), the length of the fingerprint sensor 272 may correspond to a length of the display 282.

In the embodiment illustrated, the fingerprint sensor 272 is aligned with the touchscreen display 204. More particularly, the fingerprint sensor 272 and the touchscreen display 204 (which includes both the display 282 and the touchscreen overlay 281) are centered about a common axis 129 which, in the embodiment illustrated is an axis 129 that runs midway between the left side 114 and the right side 116 of the electronic device 201 and midway between right and left sides of the fingerprint sensor 272 and midway between left and right sides of the display 282.

It will be appreciated that FIG. 4 illustrates an external face of the electronic device 201 and that other components will be included on the electronic device 201 that may not be visible from the outside of the electronic device 201. For example, the electronic device 201 may have the components described above with reference to FIG. 1.

Further Example Electronic Device

Figure 5:
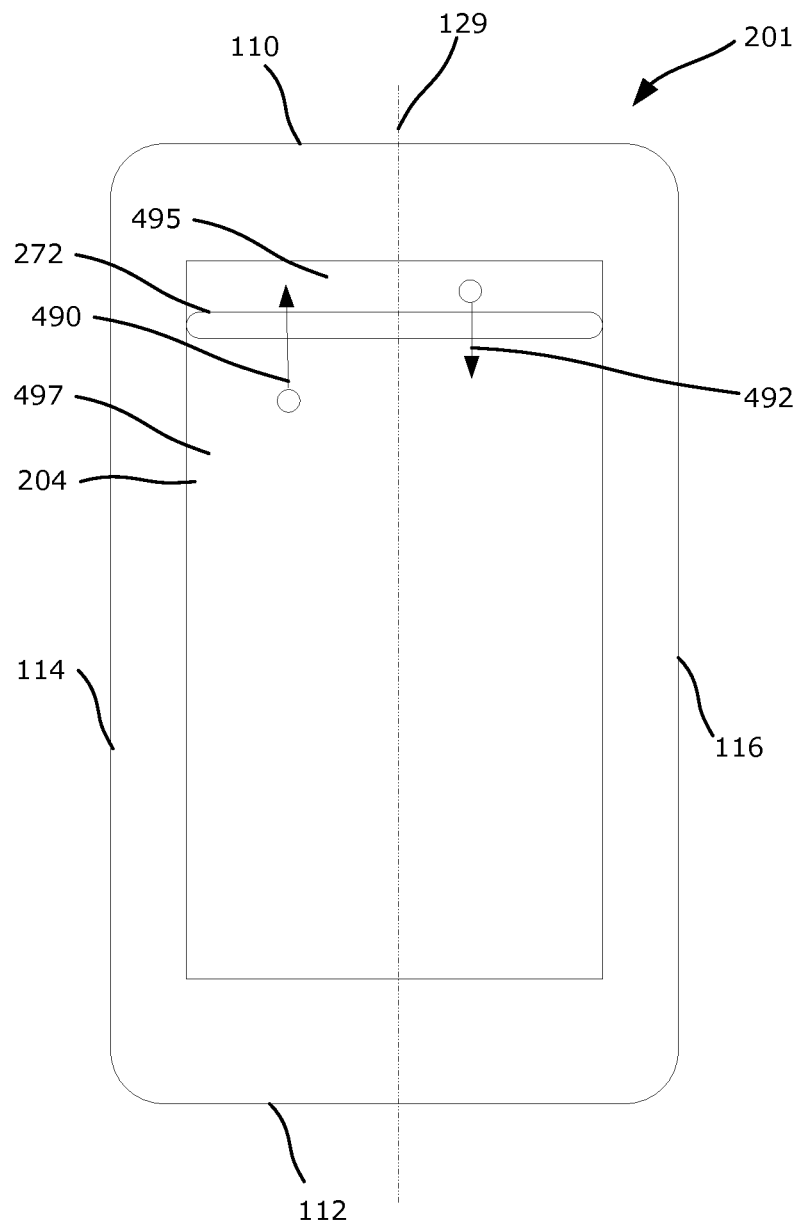
FIG. 5 is a front view of a further example electronic device in accordance with example embodiments of the present disclosure.

Referring now to FIG. 5, an example of a further electronic device 201 is illustrated. In the example of FIG. 5, the fingerprint sensor 272 is mounted on the touchscreen display 204.

More particularly, a touchscreen display 204 is included which is centrally located between a left side 114 and a right side 116 of the electronic device 201. In the example, the touchscreen display 204 is also centered between top 110 and bottom sides 112.

A fingerprint sensor 272 is included and is, in the embodiment illustrated, mounted on top of the touchscreen display 204. That is, in the example illustrated, the fingerprint sensor 272 is illustrated as being placed on top of the touchscreen display 204. However, in other embodiments, the fingerprint sensor 272 may be provided in another way. For example, to avoid having a fingerprint sensor 272 that protrudes from the electronic device 201, an opening may be provided in the touchscreen display 204 to effectively have an exterior surface that is approximately flush with the touch-sensitive surface of the touchscreen display 204.

In the example illustrated, the fingerprint sensor 272 is an elongate fingerprint sensor 272 having a length that corresponds to a dimension of the touchscreen display 204. More particularly, in the example illustrated, the length of the fingerprint sensor 272 is approximately the same (e.g. within 10%) as the width of the touchscreen display 204. In the example illustrated, the fingerprint sensor 272 has left and right ends which contact left and right ends of the touchscreen display 204. This length provides a relatively large probability of contacting the fingerprint sensor 272 when performing a gesture 490, 492 of the type described below.

The fingerprint sensor 272 effectively defines two regions of the touchscreen display 204, each associated with an opposite side of the fingerprint sensor 272. A first region 495 is associated with a first side of the touchscreen display 204 (which, in the example illustrated, is the side of the touchscreen display 204 that is above the fingerprint sensor 272) and a second region 497 is associated with a second side of the touchscreen display 204 (which, in the example illustrated, is the side of the touchscreen display 204 that is below the fingerprint sensor 272).

In the embodiment illustrated, the fingerprint sensor 272 is aligned with the touchscreen display 204. More particularly, the fingerprint sensor 272 and the touchscreen display 204 are centered about a common axis 129 which, in the embodiment illustrated is an axis 129 that runs midway between the left side 114 and the right side 116 of the electronic device 201 and midway between right and left sides of the fingerprint sensor 272 and midway between left and right sides of the touchscreen display 204.

Gesture recognition instructions 294 associated with a processor 240 of the electronic device 201 which is coupled to the touchscreen display 204 cause that processor to recognize one or more predetermined gestures 490, 492 based on input received at the touchscreen display 204 (i.e. through the overlay 281). At least one such gesture is characterized by input which is received at the touchscreen display 204 at both sides of the fingerprint sensor 272. That is, the gesture 490, 492 involves activations of two regions of the touchscreen display 204 that are separated by the fingerprint sensor 272. A first region 495 is associated with a first side of the touchscreen display 204 (which, in the example illustrated, is the side of the touchscreen display 204 that is above the fingerprint sensor 272) and a second region 497 is associated with a second side of the touchscreen display 204 (which, in the example illustrated, is the side of the touchscreen display 204 that is below the fingerprint sensor 272). More particularly, a multi-region-upward-swipe gesture 490 may be initiated at the first region 495 of the touchscreen display 204 and may proceed to the second region 497 of the touchscreen display. In performing this gesture 490, a finger travels over the fingerprint sensor 272 due to the location of the fingerprint sensor 272 relative to these two regions. When this happens, a fingerprint sample is acquired.

Similarly, a multi-region-downward-swipe gesture 492 may be initiated at the second region 297 of the touchscreen display 204 and may proceed to the first region 495 of the touchscreen. As this happens, the finger performing the gesture travels over the fingerprint sensor 272 due to the location of the fingerprint sensor 272 relative to these two regions 495, 497. When this happens, a fingerprint sample is acquired.

As noted in the discussions of the electronic devices 201 in FIGS. 2, 3 and 4, the gesture 490, 492 may be associated with a non-authentication function. Accordingly, contact with the fingerprint sensor 272 is made while a finger is performing a gesture 490, 492 having an associated function that is unrelated to authentication. In response to detecting the gesture 490, 492, the electronic device 201 may perform a non-authentication related function. Accordingly, the user may perform the gesture in order to attempt perform a non-authentication function on the electronic device 201 and, while doing so, the electronic device 201 may acquire a fingerprint sample at the fingerprint sensor 272 and may utilize that fingerprint sample for some authentication-related activity. For example, when the fingerprint sample is acquired, the electronic device 201 may automatically update user fingerprint profile data 299 (FIG. 1) to build a fingerprint profile for the current user (i.e. this may be done if the electronic device is already in a state in which it is confident that the user is an authorized user, e.g. if the device has recently been unlocked by an authorized user). In some examples, when the fingerprint sample is acquired, the electronic device 201 may automatically authenticate the current user of the electronic device 201 based on the fingerprint sample and user fingerprint profile data 299 stored in memory.

It will be appreciated that FIG. 5 illustrates an external face of the electronic device 201 and that other components will be included on the electronic device 201 that may not be visible from the outside of the electronic device 201. For example, the electronic device 201 may have the components described above with reference to FIG. 1.

Example Method of Setting Security State

Figure 6:
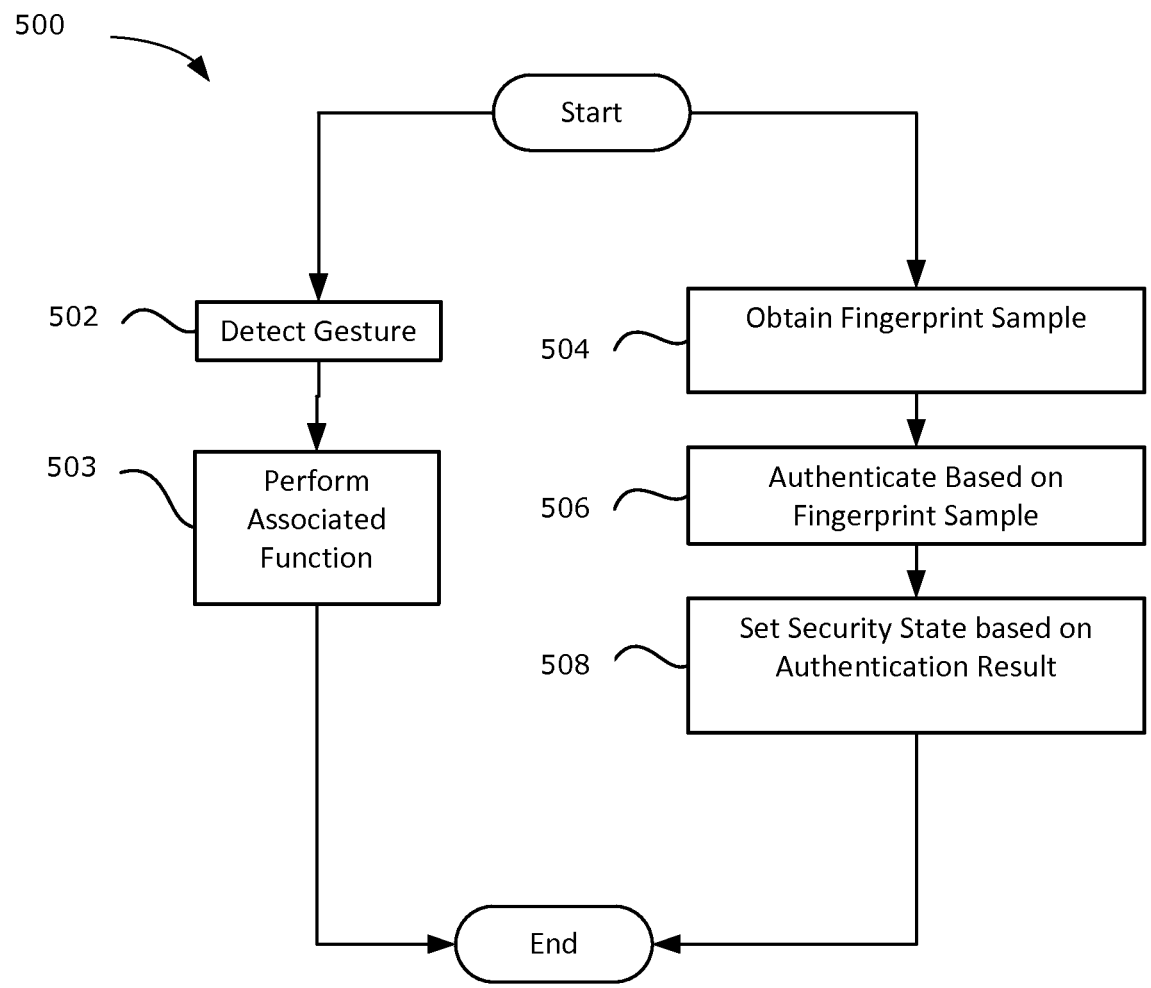
FIG. 6 is a flowchart illustrating an example method of authenticating a user in accordance with example embodiments of the present disclosure.

Referring now to FIG. 6, an example method 500 is illustrated in flowchart form. The example method 500 may, in at least some embodiments, be implemented on one or more processors of the electronic device 201. For example, a processor 240 may be associated with processor-executable instructions which, when executed, cause the processor 240 to perform the method 500. Such instructions may include, for example, gesture recognition instructions 294 (FIG. 1) which are configured for causing a processor to perform the functions of the method 500 that are related to gesture identification (e.g. step 502), fingerprint acquisition instructions 292 (FIG. 1) which are configured for causing a processor to perform the functions of the method 500 that are related to fingerprint acquisition (e.g. step 504), and/or authentication instructions (FIG. 1) which are configured for causing a processor to perform the functions an features of the method that are related to authentication (e.g. step 506 and/or 508).

The method 500 may be performed on an electronic device that is of a type described above with reference to FIGS. 1 to 5. More particularly, the electronic device 201 may include components such as those described with reference to FIG. 1 and the arrangement of some of those components may be as described with reference to any one of FIGS. 2 to 5.

At 502, a gesture is detected. More particularly, the gesture recognition instructions 294 are configured to cause a processor 240 to determine, based on input received via the touch-sensitive overlay 281 of the touchscreen display 204, whether one or more predetermined gestures has been performed. In at least some embodiments, the gesture recognition instructions 294 are configured to cause the processor 240 to detect a gesture that is characterized by input representing movement that is directed at or from the fingerprint sensor 272 and that is received, at least in part, at an end of the display 282 that is nearest the fingerprint sensor 272. Example gestures that may be detected are described in greater detail above with reference to FIGS. 2 to 5.

The gesture may be detected based on input received at the touchscreen display 204. In at least some embodiments, the gesture may interact with an input interface 206 (FIG. 1) in addition to the touchscreen display 204. For example, as noted in FIG. 3, a second input component 304 may be provided on some electronic devices on a side of the fingerprint sensor 272 that is opposite the side where the touchscreen display 204 is located. As noted in the discussion of FIG. 3 above, in some such embodiments, a gesture may be detected based on both input from the touchscreen display 204 and input from the second input component 304.

At 503, in response to detecting the gesture, a function associated with the gesture may be performed on the electronic device 201. The function is a non-authentication function. By way of example, the gesture may be associated with a command to display particular content on the touchscreen display 204. In response to detecting such a gesture, the content may be displayed on the touchscreen display 204. Accordingly, the gesture may be performed in order to attempt perform a non-authentication function on the electronic device 201.

As noted above, while the gesture is being performed or shortly thereafter or shortly before the gesture is performed, a fingerprint sample is obtained (at 504) using the fingerprint sensor 272 of the electronic device 201. More particularly, performance of the gesture that is detected at 502 causes contact with the fingerprint sensor (i.e. the finger performing the gesture contacts the fingerprint sensor). Such contact is incidental when the gesture is performed. This contact causes a fingerprint sample of the fingerprint associated with the finger to be obtained (at 504).

After the fingerprint sample is obtained (at 504), the electronic device 201 may utilize that fingerprint sample for some authentication-related activity. For example, when the fingerprint sample is acquired, the electronic device 201 may automatically update user fingerprint profile data 299 (FIG. 1) to build a fingerprint profile for the current user (i.e. this may be done if the electronic device is already in a state in which it is confident that the user is an authorized user, e.g. if the device has recently been unlocked by an authorized user). In some examples, when the fingerprint sample is acquired, the electronic device 201 may automatically authenticate (at 506) the current user of the electronic device 201 based on the fingerprint sample and user fingerprint profile data 299 stored in memory. More particularly, a comparison between the current user's fingerprint and that of the authorized user is performed to determine whether the current user is the same person as the authorized user.

Thus, authentication may be performed (at 506) using the fingerprint sample obtained at 504 and, in at least some embodiments, user fingerprint profile data 299 (FIG. 1) stored in memory associated with the electronic device 201. As noted above, the fingerprint profile data 299 represents the fingerprint of one or more authorized users of the electronic device.

After authentication is performed (at 506), the electronic device 201 may, at 508, set a security state of the electronic device 201 based on the result of the authentication operation. For example, one or more secure features of the electronic device may be enabled (i.e. if the current user is determined to be an authorized user) or disabled (i.e. if the current user is determined to be an unauthorized user) based on the result of the authentication operation. By way of example, secure features may include the ability to make a telephone from the electronic device, make a long distance telephone from the electronic device, send an electronic message from the electronic device, access the Internet, access a secure area of memory, access a secure application, delete a file or application, or initiate a download or an upload of data. Other secure features may be provided in other embodiments.

In at least some embodiments, the electronic device may be set to a locked state (in which a number of features of the electronic device are unavailable) if the current user is determined to be unauthorized. Similarly, in at least some embodiments, the electronic device may be set to an unlocked state (in which the features disabled in the locked state are available) if the current user is determined to be authorized.

The authentication at 506 is, in at least some embodiments, configured to operate as a background process (i.e. performed while the device appears to be doing other things). More particularly, a fingerprint sample may be captured passively (i.e. without first presenting a prompt to a user requiring the user to engage the fingerprint sensor). The fingerprint ample may be captured when a user happens to place their finger over the fingerprint sensor. Accordingly, in at least some embodiments, the electronic device 201 may, at the start of the method 500, be operating in an unlocked state where one or more secure features are enabled. A fingerprint sample is then acquired at 504 as a result of the performance of the gesture detected at 502. At this point, the fingerprint sample has been obtained without a corresponding prompt having been generated on the device (i.e. without a prompt requesting the user to engage the fingerprint sensor). Using the fingerprint sample that was obtained through incidental contact with the fingerprint sensor 272, the authentication is performed. If the current user is authenticated, then the electronic device 201 may continue to operate in the unlocked state. In this scenario, the authentication has occurred unbeknownst to the user. However, if the user is not authorized, then the electronic device may be placed into a locked state at 508.

Thus, in at least some embodiments, a fingerprint-based authentication is described which operates unbeknownst to an authorized user. That is, if the current user is an authorized user, then the authentication process of the method 500 operates without being apparent to that user.

Further Example Method of Setting Security State

Figure 7:
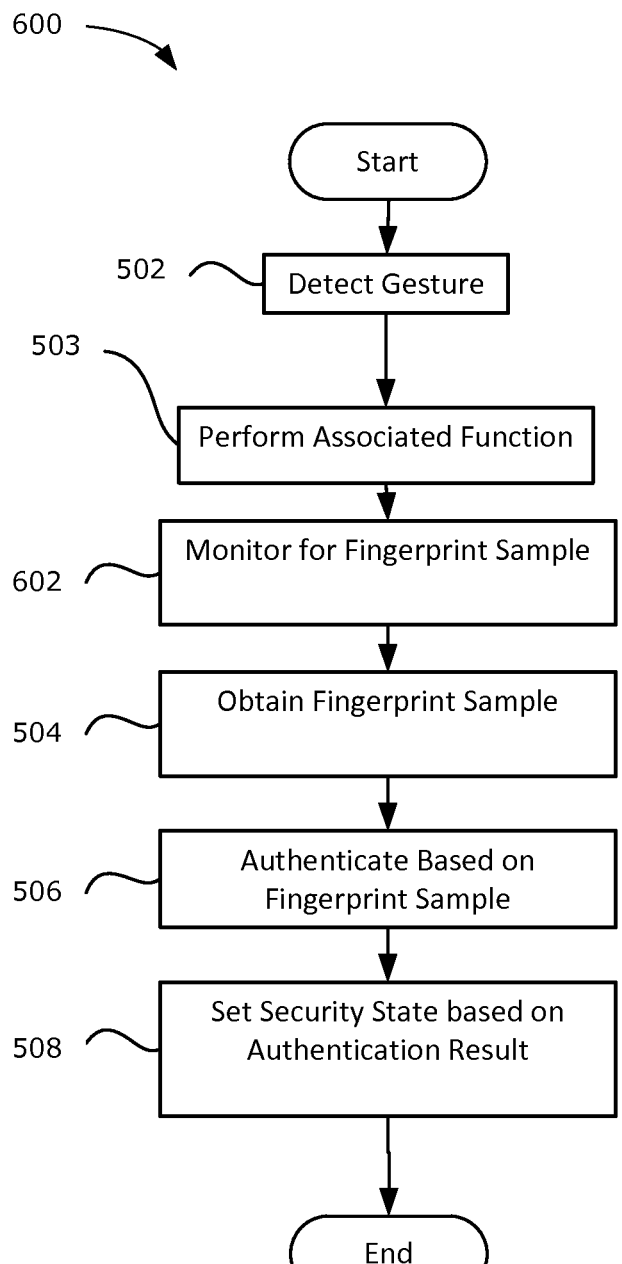
FIG. 7 is a flowchart illustrating a further example method of authenticating a user in accordance with example embodiments of the present disclosure.

A further example method 600 is illustrated in FIG. 7. The method 600 of FIG. 7 includes many features that are described above with reference to the method 500 of FIG. 6. The discussion of these features will not be repeated at length.

While the method 500 of FIG. 6 was described as a parallel process in which the gesture detection (at 502) was performed at approximately the same time as when the fingerprint sample was obtained (at 504), the method 600 of FIG. 7 operates more serially.

The example method 600 may, in at least some embodiments, be implemented on one or more processors of the electronic device 201. For example, a processor 240 may be associated with processor-executable instructions which, when executed, cause the processor 240 to perform the method 600. Such instructions may include, for example, gesture recognition instructions 294 (FIG. 1) which are configured for causing a processor to perform the functions of the method 600 that are related to gesture identification (e.g. step 502), fingerprint acquisition instructions 292 (FIG. 1) which are configured for causing a processor to perform the functions of the method 600 that are related to fingerprint acquisition (e.g. step 504), and/or authentication instructions (FIG. 1) which are configured for causing a processor to perform the functions an features of the method that are related to authentication (e.g. step 506 and/or 508).

At 502 a gesture is detected in the manner described above with reference to the method 500 of FIG. 6.

In at least some embodiments, the electronic device 201 is a device of the type described above with reference to FIG. 2. For example, a fingerprint sensor 272 may be included on the electronic device immediately adjacent to a touchscreen display 204. In such embodiments, the gesture may be a swipe-towards-fingerprint-sensor gesture that is characterized by input representing a swipe in the direction of the fingerprint sensor. That is, the gesture may be a swipe which begins away from the end 120 (FIG. 2) of the touchscreen display 204 that is nearest the fingerprint sensor 272 and that proceeds to the end 120 of the touchscreen display 204 that is nearest the fingerprint sensor 272.

In response to detecting the gesture, an associated function is performed at 503 in the manner described above with reference to the method 500 of FIG. 6.

In response to detecting the gesture, at 602 the electronic device 201 may monitor for a fingerprint sample. That is, the performance of the gesture (which may be the swipe-towards-fingerprint-sensor gesture) may act as a trigger to cause the electronic device to begin monitoring for a fingerprint sample. If the electronic device 201 is oriented as described above with reference to FIG. 2, the electronic device may expect the fingerprint sensor to be contacted shortly after the gesture is performed. Thus, the monitoring may begin in some such embodiments as a result of having detected the gesture.

Then, at 504, a fingerprint sample is obtained and, at 506, authentication is performed based on the fingerprint sample. Then, at 508, a security state of the electronic device is set based on the authentication result. 504, 506 and 508 are described in greater detail above with reference to the method 500 of FIG. 6.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An electronic device comprising:
a touchscreen display;
a fingerprint sensor adjacent the touchscreen display; and
one or more processors associated with processor-executable instructions, at least one of the processors being coupled with the touchscreen display and at least one of the processors being coupled with the fingerprint sensor, the instructions including:
gesture recognition instructions associated with one or more of the processors that is coupled with the touchscreen display, the gesture recognition instructions being configured to cause that processor to detect a gesture that is characterized by input representing movement that is directed at or from the fingerprint sensor, the input being received, at least in part, at an end of the touchscreen display that is nearest the fingerprint sensor;
fingerprint acquisition instructions associated with one or more of the processors that is coupled with the fingerprint sensor, the fingerprint acquisition instructions being configured to cause that processor to obtain a fingerprint sample from the fingerprint sensor; and
fingerprint authentication instructions associated with one or more of the processors, the fingerprint authentication instructions being configured to cause that processor to authenticate a user based on the fingerprint sample obtained from the fingerprint sensor,
wherein the fingerprint sensor is positioned within one millimeter of the touchscreen display such that the gesture may cause incidental contact with the fingerprint sensor to allow the fingerprint sample to be captured passively while other things are done on the electronic device.

2. The electronic device of claim 1, wherein the gesture is a swipe-towards-fingerprint-sensor gesture characterized by input representing a swipe in the direction of the fingerprint sensor, and wherein the fingerprint acquisition instructions cause at least one of the processors to monitor for a fingerprint sample in response to detecting the swipe-towards-fingerprint-sensor gesture.

3. The electronic device of claim 1, wherein the gesture recognition instructions and the fingerprint acquisition instructions are associated with a common processor.

4. The electronic device of claim 1, wherein the gesture is a swipe-towards-fingerprint-sensor gesture that is characterized by movement between a portion of the touchscreen display that is away from the fingerprint sensor to a portion of the touchscreen display that is immediately adjacent to the fingerprint sensor.

5. The electronic device of claim 1, wherein the gesture is characterized by a movement that engages both the touchscreen display and the fingerprint sensor.

6. The method of claim 5, wherein the processor associated with the gesture recognition instructions is coupled with the fingerprint sensor and wherein the gesture recognition instructions cause the processor to determine that the gesture has been performed based on input received at the fingerprint sensor and the touchscreen display.

7. The electronic device of claim 1, wherein one or more of the processors are further associated with instructions that cause one or more of the processors to perform at least one function apart from authentication of the fingerprint sample in response to detecting the gesture.

8. The electronic device of claim 1, wherein the touchscreen display comprises a display and a first input component, the first input component being touch-sensitive, and wherein the electronic device further comprises:
a second input component disposed on a side of the fingerprint sensor that is opposite a side of the fingerprint sensor that is nearest the touchscreen display,
and wherein the at least one processor associated with the gesture recognition instructions is configured to receive an electrical signal from the second input component, the electrical signal representing input received at the second input component,
and wherein the gesture is characterized by movement that engages both the first input component and the second input component.

9. The electronic device of claim 8, wherein the second input component is a second touchscreen display.

10. The electronic device of claim 1, further comprising:
a bezel framing the display and the fingerprint sensor and wherein a touch-sensitive overlay associated with the touchscreen display extends over at least a portion of the bezel.

11. The electronic device of claim 1, wherein the fingerprint sensor is an elongate fingerprint sensor having a length that corresponds to a dimension of the touchscreen display.

12. The electronic device of claim 1, wherein the gesture is a swipe-from-predetermined-location gesture that is characterized by input representing movement having a trajectory that indicates that the movement originated from a predetermined location, the predetermined location being opposite the side of the fingerprint sensor that is nearest the touchscreen display.

13. The electronic device of claim 12, wherein the predetermined location is associated with an indicator.

14. The electronic device of claim 13, wherein the indicator is a secondary display.

15. The electronic device of claim 13, wherein the indicator is a logo printed onto a surface of the electronic device.

16. The electronic device of claim 13, wherein the indicator is an output device and wherein at least one of the processors is coupled with the indicator and is configured to change the state of the indicator when predetermined criteria is satisfied and wherein the gesture recognition instructions are configured to cause one of the processors to monitor for the swipe-from-predetermined-location gesture when the state of the indicator corresponds to a predetermined state.

17. An electronic device comprising:
a touchscreen display;
a fingerprint sensor adjacent the touchscreen display;
a gesture recognition component coupled with the touchscreen display, the gesture recognition component being configured to detect a gesture that is characterized by input representing movement that is directed at or from the fingerprint sensor, the input being received, at least in part, at an end of the touchscreen display that is nearest the fingerprint sensor;
a fingerprint acquisition component coupled with the fingerprint sensor, the fingerprint acquisition component being configured to cause that processor to obtain a fingerprint sample from the fingerprint sensor, wherein the fingerprint sensor is positioned within one millimeter of the touchscreen display such that the gesture may cause incidental contact with the fingerprint sensor to allow the fingerprint sample to be captured passively while other things are done on the electronic device.

18. The electronic device of claim 17, wherein the gesture recognition component and the fingerprint acquisition component are implemented on one or more processors of the electronic device.

19. A method implemented on a processor of an electronic device, the electronic device comprising a touchscreen display and a fingerprint sensor adjacent the touchscreen display, the method comprising:

detecting a gesture that is characterized by input representing movement that is directed at or from the fingerprint sensor, the input being received, at least in part, at an end of the touchscreen display that is nearest the fingerprint sensor;

obtaining a fingerprint sample from the fingerprint sensor; and authenticating a user based on the fingerprint sample obtained from the fingerprint sensor, wherein the fingerprint sensor is positioned within one millimeter of the touchscreen display such that the gesture may cause incidental contact with the fingerprint sensor to allow the fingerprint sample to be captured passively while other things are done on the electronic device.

20. The method of claim 19 wherein the gesture is a swipe-towards-fingerprint-sensor gesture characterized by input representing a swipe in the direction of the fingerprint sensor, the method further comprising:

monitoring for a fingerprint sample in response to detecting the swipe-towards-fingerprint-sensor gesture.

* * * * *